US008933779B2

(12) United States Patent
Kobayashi

(10) Patent No.: US 8,933,779 B2
(45) Date of Patent: Jan. 13, 2015

(54) IMAGE DISPLAY DEVICE, IMAGE DISPLAY SYSTEM, AND METHOD OF CONTROLLING IMAGE DISPLAY DEVICE

(71) Applicant: Seiko Epson Corporation, Tokyo (JP)

(72) Inventor: Makoto Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 152 days.

(21) Appl. No.: 13/787,986

(22) Filed: Mar. 7, 2013

(65) Prior Publication Data

US 2013/0257588 A1 Oct. 3, 2013

(30) Foreign Application Priority Data

Mar. 29, 2012 (JP) ................................. 2012-076477

(51) Int. Cl.
| | | |
|---|---|---|
| *G05B 19/00* | (2006.01) | |
| *G05B 1/00* | (2006.01) | |
| *G06Q 30/06* | (2012.01) | |
| *G09G 3/00* | (2006.01) | |
| *H04N 9/31* | (2006.01) | |
| *G06F 21/00* | (2013.01) | |
| *H04N 7/167* | (2011.01) | |
| *G06F 7/04* | (2006.01) | |
| *G06K 15/00* | (2006.01) | |

(52) U.S. Cl.
CPC .............. *G05B 1/00* (2013.01); *G06Q 30/0645* (2013.01); *G09G 3/001* (2013.01); *H04N 9/3179* (2013.01); *G09G 2330/02* (2013.01)
USPC ................. 340/5.54; 705/51; 380/200; 726/5; 358/1.14

(58) Field of Classification Search
CPC ............. G07C 9/00142; G07C 9/0069; H04N 21/4405; H04N 7/1675; G06Q 50/22; G06F 21/10
USPC .............. 340/5.54; 705/51; 380/200; 726/16; 358/1.14
See application file for complete search history.

(56) References Cited

U.S. PATENT DOCUMENTS 5,862,299 A * 1/1999 Lee et al. ........................ 386/253
6,993,508 B1 * 1/2006 Major et al. ..................... 705/51

(Continued)

FOREIGN PATENT DOCUMENTS

| JP | 2004-297557 A | 10/2004 |
|---|---|---|
| JP | 2007-178745 A | 7/2007 |

(Continued)

*Primary Examiner* — Jack K Wang
(74) *Attorney, Agent, or Firm* — ALG Intellectual Property, LLC

(57) ABSTRACT

An image display device includes: a clock section for timing current date/time information including a date and a time; an expiration date/time storage section for storing expiration date/time information as information of a date/time until which use of the image display device is allowed; a password accepting section for accepting input of a password encoded based on predetermined expiration date/time information; a decoding section for decoding the predetermined expiration date/time information from information of the password accepted by the password accepting section; a comparison section for comparing the predetermined expiration date/time information decoded by the decoding section and the current date/time information timed by the clock section with each other; and an expiration date/time update section for storing the predetermined expiration date/time information in the expiration date/time storage section if the predetermined expiration date/time information decoded is a date/time one of on and later than the current date/time information.

15 Claims, 8 Drawing Sheets

(56) References Cited

U.S. PATENT DOCUMENTS

| | | | |
|---|---|---|---|
| 8,307,448 B2* | 11/2012 | Shimizu et al. | 726/26 |
| 8,498,518 B2* | 7/2013 | Takao et al. | 386/248 |
| 2002/0120667 A1* | 8/2002 | Nakano | 709/200 |
| 2003/0077074 A1* | 4/2003 | Okamoto et al. | 386/94 |
| 2003/0158741 A1* | 8/2003 | Nakano | 704/503 |
| 2005/0144134 A1* | 6/2005 | Hirano | 705/51 |
| 2007/0265966 A1* | 11/2007 | Kahn et al. | 705/51 |
| 2008/0052536 A1* | 2/2008 | Shimizu et al. | 713/193 |
| 2008/0104539 A1* | 5/2008 | Ikeda | 715/808 |
| 2008/0186527 A1* | 8/2008 | Eguchi et al. | 358/1.14 |
| 2008/0307533 A1* | 12/2008 | Hanai | 726/30 |
| 2008/0320533 A1* | 12/2008 | Kitazato | 725/98 |
| 2009/0178070 A1* | 7/2009 | Mitsuji et al. | 725/4 |
| 2009/0268905 A1* | 10/2009 | Matsushima et al. | 380/200 |
| 2011/0066523 A1* | 3/2011 | Harrison, Jr. | 705/26.35 |
| 2012/0144458 A1* | 6/2012 | Mechaley, Jr. | 726/5 |

FOREIGN PATENT DOCUMENTS

| | | |
|---|---|---|
| JP | 2011-100376 A | 5/2011 |
| JP | 2011-100377 A | 5/2011 |

\* cited by examiner

IMAGE DISPLAY DEVICE, IMAGE DISPLAY SYSTEM, AND METHOD OF CONTROLLING IMAGE DISPLAY DEVICE

CROSS-REFERENCE

The entire disclosure of Japanese Patent Application No. 2012-076477 filed on Mar. 29, 2012, which is hereby incorporated by reference in its entirety.

BACKGROUND

1. Technical Field

The present invention relates to an image display device, an image display system, and a method of controlling an image display device.

2. Related Art

In the past, there has been known a projector making the image projection possible only in a use-permission period set in advance (Japanese Patent Publication No. 2011-100376 (Document 1)). According to such a projector, the projector can be prevented from being used by another user if the projector is lent, and remains unreturned even after the end of the use-permission period.

Further, there has been known a projection display device, which superimposes a secondary image on a primary image when a predetermined time set in advance is reached. According to such a projection display device, it is possible to inform the user of the rental term in the case in which, for example, the projection display device (a projector) is lent (Japanese Patent Publication No. 2004-297557 (Document 2)).

As described in Document 1 and Document 2, the image display device such as a projector is often used for a rental purpose. In such a configuration, the rental company sets the rental term to the image display device when lending the image display device. Therefor, if extension of the rental term is desired, it is required that the image display device is returned once to the rental company to perform resetting of the rental term, or that the person in charge in the rental company visits the installation place of the image display device to perform resetting of the rental term. Therefore, there has been demanded the image display device the rental term of which can easily be changed.

SUMMARY

An advantage of some aspects of the invention is to solve at least a part of the problem described above, and the invention can be implemented as the following forms or application examples.

Application Example 1

This application example is directed to an image display device adapted to display an image and including a clock section adapted to time current date/time information including a date and a time, an expiration date/time storage section adapted to store expiration date/time information as information of a date/time until which use of the image display device is allowed, a password accepting section adapted to accept input of a password encoded based on predetermined expiration date/time information, a decoding section adapted to decode the predetermined expiration date/time information from information of the password accepted by the password accepting section, a comparison section adapted to compare the predetermined expiration date/time information decoded by the decoding section and the current date/time information timed by the clock section with each other, and an expiration date/time update section adapted to store the predetermined expiration date/time information in the expiration date/time storage section if the predetermined expiration date/time information decoded is a date/time one of on and later than the current date/time information.

According to such an image display device, the expiration date/time storage section stores the expiration date/time information of the image display device. The password accepting section accepts input of a password, which is encoded based on the predetermined expiration date/time information. The decoding section decodes the predetermined expiration date/time information based on the information of the password. The expiration date/time update section stores the predetermined expiration date/time information in the expiration date/time storage section if the predetermined expiration date/time information decoded is a date/time on or later than the current date/time information. Thus, by the user inputting the password, the expiration date/time of the image display device can be changed.

Application Example 2

This application example is directed to the image display device according to the above application example, wherein the image display device further includes a unique number storage section adapted to store a unique number of the image display device, the password is encoded based on information of the unique number of the image display device and the predetermined expiration date/time information, and the decoding section decodes the predetermined expiration date/time information based on the information of the password accepted by the password accepting section and the information of the unique number stored in the unique number storage section.

According to such an image display device, the password accepting section accepts input of the password, which is encoded based on the information of the unique number of the image display device and the predetermined expiration date/time information. The decoding section decodes the predetermined expiration date/time information based on the information of the password and the information of the unique number. Thus, by the user inputting the password, the expiration date/time of the image display device can be changed. Further, since the password is encoded based on the predetermined expiration date/time information and the information of the unique number, it is possible to prevent the password from being diverted to another image display device.

Application Example 3

This application example is directed to the image display device according to the above application example, wherein the image display device further includes a unique number storage section adapted to store a unique number of the image display device, the password is encoded based on information of the unique number of the image display device and the predetermined expiration date/time information, the decoding section decodes the predetermined expiration date/time information and the information of the unique number based on the information of the password accepted by the password accepting section, and the comparison section compares the predetermined expiration date/time information decoded by the decoding section and the current date/time information timed by the clock section with each other if the unique number decoded and the unique number stored in the unique number storage section match each other.

According to such an image display device, the password accepting section accepts input of the password, which is encoded based on the information of the unique number of the image display device and the predetermined expiration date/time information. The decoding section decodes the predetermined expiration date/time information and the information of the unique number based on the information of the password. The comparison section compares the predetermined expiration date/time information decoded by the decoding section and the current date/time information with each other if the unique number decoded and the unique number stored in the unique number storage section match each other. Thus, since the expiration date/time of the image display device is not changed if the unique number decoded does not match the unique number stored in the unique number storage section, it is possible to prevent the password from being diverted to another image display device.

Application Example 4

This application example is directed to the image display device according to the above application example, wherein the password accepting section accepts input of the password if a date/time represented by the current date/time information exceeds a date/time represented by the expiration date/time information stored in the expiration date/time storage section when the image display device is powered on.

According to such an image display device, the password is accepted if the current date/time information exceeds the expiration date/time information stored in the expiration date/time storage section when the image display device is powered on. Thus, the user can recognize the expiration of the image display device, and then update the expiration date/time information by inputting the password at the start-up of the image display device.

Application Example 5

This application example is directed to the image display device according to the above application example, wherein the image display device further includes a function restriction section adapted to restrict use of a predetermined function of the image display device if the password accepting section fails to accept the valid password.

According to such an image display device, use of the predetermined function of the image display device is restricted if the valid password is not input. Thus, since the user can recognize the expiration, it is possible to reduce the continuous use of the image display device.

Application Example 6

This application example is directed to the image display device according to the above application example, wherein the image display device further includes a restricted function storage section adapted to store a restricted function, use of which is restricted by the function restriction section, a mode control section adapted to make a transition to an administrator-right mode if a predetermined operation is performed on the image display device, a restricted function selection section adapted to make the restricted function use of which is restricted by the function restriction section be selected in the administrator-right mode, and a control section adapted to store the restricted function selected by the restricted function selection section in the restricted function storage section.

According to such an image display device, the restricted function selection section makes the restricted function use of which is restricted by the function restriction section be selected in the administrator-right mode. The control section stores the restricted function thus selected to the restricted function storage section. Thus, it is possible to change the restricted function use of which is restricted by the function restriction section in the administrator-right mode.

Application Example 7

This application example is directed to the image display device according to the above application example, wherein the password accepting section receives the password encoded based on information of the predetermined restricted function use of which is restricted by the function restriction section in addition to the information of the unique number of the image display device and the predetermined expiration date/time information, the decoding section decodes the predetermined expiration date/time information and the information of the predetermined restricted function, and the control section stores the predetermined restricted function in the restricted function storage section.

According to such an image display device, input of the password, which is encoded based on the information of the unique number of the image display device, the predetermined expiration date/time information, and the information of the predetermined restricted function use of which is restricted by the function restriction section, is accepted. The decoding section decodes the predetermined expiration date/time information and the information of the predetermined restricted function. Further, the control section stores the predetermined restricted function to the restricted function storage section. Thus, it is possible to change the restricted function use of which is restricted by the function restriction section by input of the password.

Application Example 8

This application example is directed to an image display system including the image display device according to the above application example, and a password generation device adapted to perform encoding based on the information of the unique number of the image display device and the predetermined expiration date/time information to generate the password.

According to such an image display system, by the user inputting the password, which is generated by the password generation device, to the image display device, the expiration date/time of the image display device can be changed. Further, since the password is encoded based on the predetermined expiration date/time information and the information of the unique number, it is possible to prevent the password from being diverted to another image display device.

Application Example 9

This application example is directed to an image display system including the image display device according to the above application example, and a password generation device adapted to perform encoding based on the information of the unique number of the image display device, the predetermined expiration date/time information, and the information of the predetermined restricted function to generate the password.

According to such an image display system, by the user inputting the password, which is generated by the password generation device, to the image display device, the expiration date/time and the restricted function of the image display device can be changed. Further, since the password is encoded based on the predetermined expiration date/time information, the information of the unique number, and the information of the predetermined restricted function, it is possible to prevent the password from being diverted to another image display device.

Application Example 10

This application example is directed to a method of controlling an image display device including providing the image display device having a clock section adapted to time current date/time information including a date and a time, an expiration date/time storage section adapted to store expiration date/time information as information of a date/time until which use of the image display device is allowed, and a unique number storage section adapted to store a unique number of the image display device, and adapted to display an image, accepting input of a password encoded based on the information of the unique number of the image display device and the predetermined expiration date/time information, decoding the predetermined expiration date/time information from information of the password accepted in the accepting, comparing the predetermined expiration date/time information decoded in the decoding and the current date/time information timed by the clock section with each other, and storing the predetermined expiration date/time information in the expiration date/time storage section if the predetermined expiration date/time information decoded is a date/time one of on and later than the current date/time information.

According to such a method of controlling an image display device, by the user inputting the password, the expiration date/time of the image display device can be changed.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a projector as an image display device for updating the expiration date/time based on a password input thereto and a personal computer (PC) for generating the password will be explained as a first embodiment.

Figure 1:
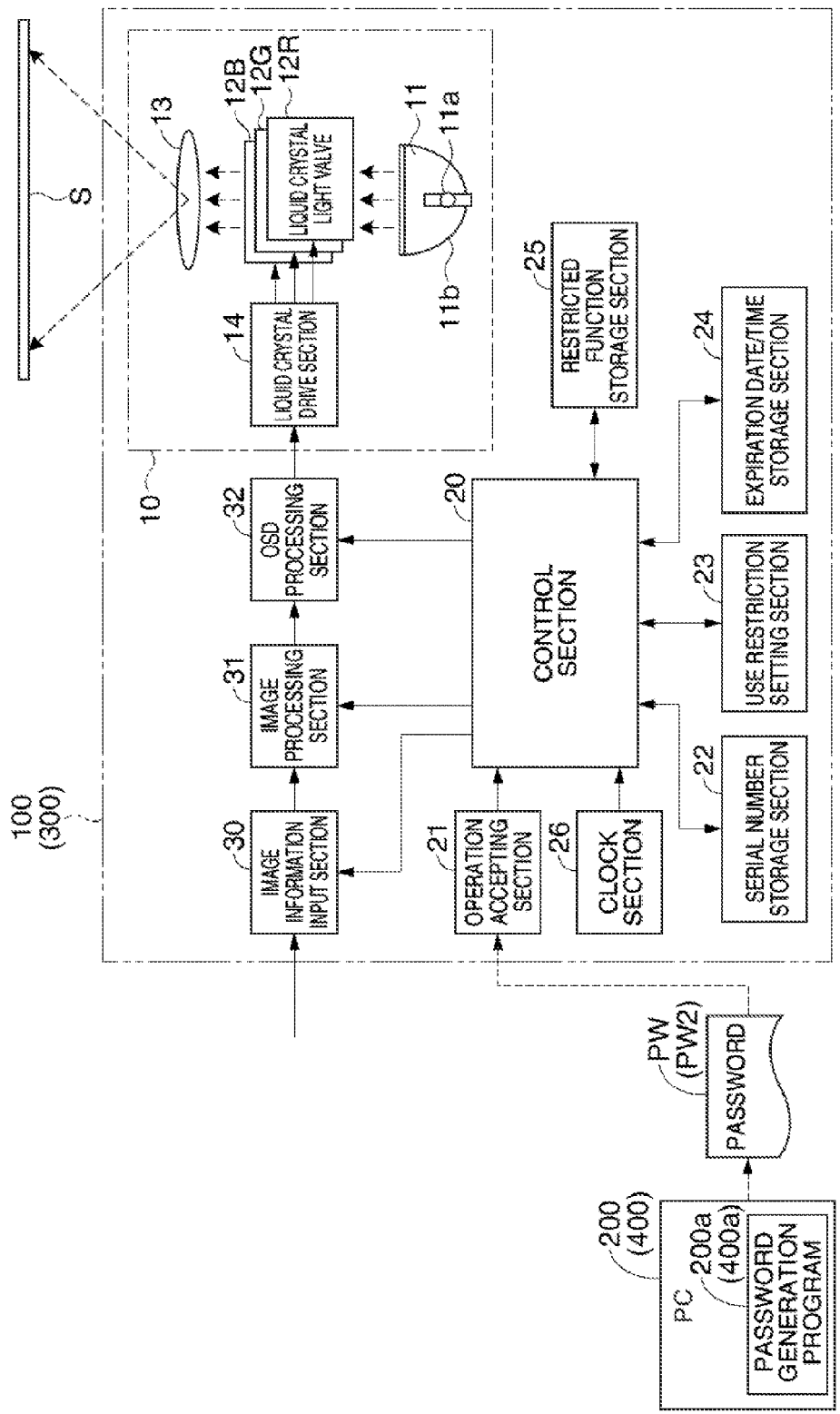
FIG. 1 is a block diagram showing a schematic configuration of a projector and a PC according to a first embodiment of the invention.

FIG. 1 is a block diagram showing a schematic configuration of the projector 100 and the PC 200 according to the first embodiment. It should be noted that the projector 100 and the PC 200 are also referred to collectively as an image display system. In this case, the PC 200 corresponds to a password generation device.

As shown in FIG. 1, the projector 100 is provided with an image projection section 10, a control section 20, an operation accepting section 21, a serial number storage section 22 as a unique number storage section, a use restriction setting section 23, an expiration date/time storage section 24, a restricted function storage section 25, a clock section 26, an image information input section 30, an image processing section 31, an OSD processing section 32, and so on.

The image projection section 10 is composed mainly of a light source device 11, three liquid crystal light valves 12R, 12G, and 12B as a light modulation device, a projection lens 13 as a projection optical system, and a liquid crystal drive section 14. The image projection section 10 modulates the light emitted from the light source device 11 into the image light with the liquid crystal light valves 12R, 12G, and 12B, and then projects the image light from the projection lens 13 to thereby display it on the projection surface S.

The light source device 11 is configured including a discharge light source lamp 11a formed of, for example, a superhigh pressure mercury lamp or a metal halide lamp, and a reflector 11b for reflecting the light, which is emitted by the light source lamp 11a, toward the liquid crystal light valves 12R, 12G, and 12B. The light emitted from the light source device 11 is converted into light having a substantially even intensity distribution by an integrator optical system not shown, and is separated into colored light components of red (R), green (G), and blue (B), the three primary colors of light, by a color separation optical system not shown, and then the colored light components enter the liquid crystal light valves 12R, 12G, and 12B, respectively.

The liquid crystal light valves 12R, 12G, and 12B are each composed mainly of a liquid crystal panel having a liquid crystal material encapsulated between a pair of transparent substrates. The liquid crystal light valves 12R, 12G, and 12B are each provided with a pixel area having a rectangular shape with a plurality of pixels (not shown) arranged in a matrix, and arranged so as to be able to apply a drive voltage to the liquid crystal material pixel by pixel. When the liquid crystal drive section 14 applies the drive voltage corresponding to the image information input thereto to each of the pixels, each of the pixels is set to have a light transmittance corresponding to the image information. Therefore, the light emitted from the light source device 11 is modulated while being transmitted through the liquid crystal light valves 12R, 12G, and 12B, thus the image lights corresponding to the image information are formed for the respective colored lights. The image lights of the respective colors are combined pixel-by-pixel by a color combining optical system not shown to be formed as color image light, and then projected in an enlarged manner by the projection lens 13.

The control section 20 is provided with a central processing unit (CPU), a random access memory (RAM) used for temporarily storing various data and so on, a read only memory (ROM) having a nonvolatile property, and so on. The control section 20 performs the overall control of the operation of the projector 100 due to the CPU operating with a control program stored in the ROM. In other words, the control section 20 functions as a computer.

The operation accepting section 21 is for accepting an input operation of the user, and is provided with a plurality of operation keys for the user to provide various instructions to the projector 100. As the operation keys provided to the operation accepting section 21 according to the present embodiment, there are cited a power key for switching between ON and OFF of the power, an input switching key for switching the input terminal, a menu key for displaying a menu screen for various settings, direction keys corresponding respectively to up, down, right, and left directions used for selection of the items in the menu screen, a determination key for determining the item thus selected, a cancel key used for canceling the operation or getting back to a superior menu screen, numeric keys for inputting a password.

When the user operates the various operation keys of the operation accepting section 21, the operation accepting section 21 outputs an operation signal corresponding to the content of the operation by the user to the control section 20 in response to the input operation. It should be noted that it is also possible to adopt a configuration of using a remote controller (not shown) capable of a remote operation as the operation accepting section 21. In this case, the remote controller transmits an operation signal on an infrared ray or the like corresponding to the content of the operation by the user, and then a receiving section not shown receives the operation signal and then transmits it to the control section 20.

The serial number storage section 22 is formed of a nonvolatile memory, and stores a serial number, a unique number of the projector 100. In the present embodiment, the serial number is assumed to be a product serial number of the projector 100. The serial number is written in the serial number storage section 22 when manufacturing the projector 100. The control section 20 performs the writing in and the reading out of the serial number to and from the serial number storage section 22.

The use restriction setting section 23 is formed of a nonvolatile memory, and stores whether or not the use restriction setting of the projector 100 is set to an ON state. The use restriction setting denotes whether or not the expiration date/time of the projector 100 is set, and is set by, for example, the rental company lending the projector 100. The control section 20 performs the writing in and the reading out of the use restriction setting to and from the use restriction setting section 23.

The expiration date/time storage section 24 is formed of a nonvolatile memory, and stores information of the expiration date/time of the projector 100. In the present embodiment, the expiration date/time storage section 24 is assumed to be able to store a date and a time as the expiration date/time information. The control section 20 performs the writing in and the reading out of the expiration date/time information.

The restricted function storage section 25 is formed of a nonvolatile memory, and stores the function (the restricted function) of the projector 100, which is restricted when the projector 100 gets into a function-restricted state (a state in which the function is partially restricted) described later. If the projector 100 is started up in the administrator-right mode, the control section 20 performs writing of a restricted function to the restricted function storage section 25 in accordance with the input operation, wherein use of the restricted function is restricted. Further, if the projector 100 is started up in a normal mode, and gets into a function-restricted state, the control section 20 reads out the restricted function stored in the restricted function storage section 25, and restricts the use of the restricted function.

Here, the menu image for setting the expiration date/time will be explained.

Figure 2:
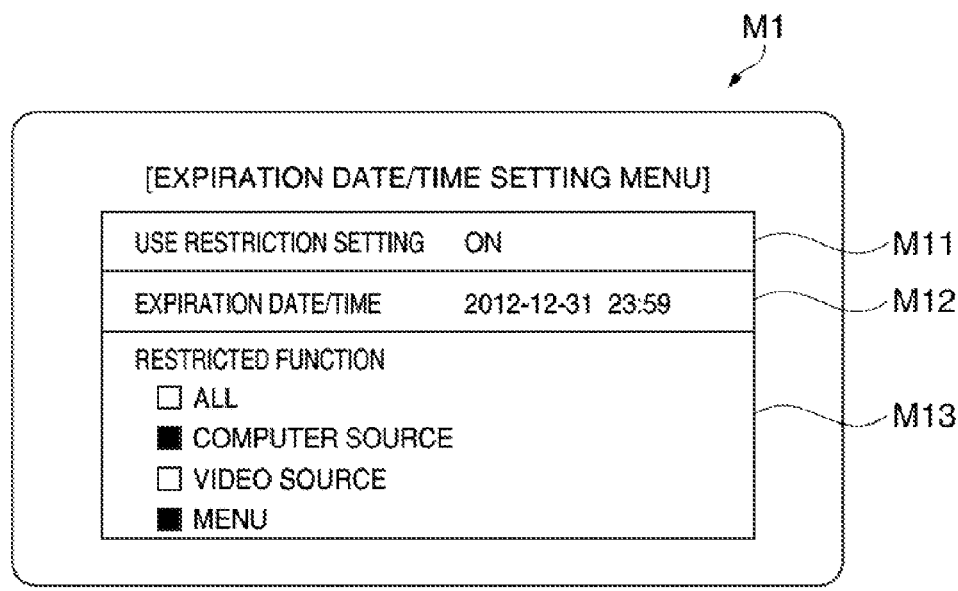
FIG. 2 is an explanatory diagram of an expiration date/time setting menu image.

FIG. 2 is an explanatory diagram of the expiration date/time setting menu image.

When starting up the projector 100 in the administrator-right mode, the control section 20 issues an instruction to the OSD processing section 32 to display the expiration date/time setting menu image M1 shown in FIG. 2. It should be noted that, in order to start up the projector 100 in the administrator-right mode, it is assumed in the present embodiment that, for example, the power-ON operation is performed while holding down a specific key. When starting up the projector 100 in the administrator-right mode as described above, the control section 20 corresponds to a mode control section.

In the expiration date/time setting menu image M1, the "use restriction setting," the "expiration date/time," and the "restricted function" can be set. In the upper part of the expiration date/time setting menu image M1, there is displayed a use restriction setting field M11. The user can set the use restriction setting to the use restriction setting section 23 while switching between ON and OFF of the use restriction setting by operating the operation accepting section 21.

In the central part of the expiration date/time setting menu image M1, there is displayed an expiration date/time field M12. The user can input the date/time of the expiration and store it in the expiration date/time storage section 24 by operating the operation accepting section 21.

In the lower part of the expiration date/time setting menu image M1, there is displayed a restricted function field M13. The user can select the restricted function of the projector 100, which is restricted in the function-restricted state, and store it in the restricted function storage section 25 by operating the operation accepting section 21. When selecting the restricted function as described above, the operation accepting section 21 and the control section 20 correspond to a restricted function selection section. In the present embodiment, there is displayed the state in which a "computer source" and a "menu" are set as the restricted functions. As described above, a plurality of restricted functions can also be selected. It should be noted that although four items are displayed in the restricted function field M13, the functions, which can be restricted, are not limited to these functions, but other functions can also be restricted.

Returning to FIG. 1, the clock section 26 has a calendar function and a clock function, and times a date and a time. Specifically, the clock section 26 has a real-time clock, and performs timing with an internal battery. The information of the date/time thus timed is read out as current date/time information by the control section 20.

The image information input section 30 is provided with a plurality of input terminals (not shown), and a variety of types of image information are input to these input terminals from an external image supply device not shown such as a video playback device or a personal computer. The image information input section 30 selects the image information thus input in accordance with the instruction of the control section 20, and then outputs the image information, which has been selected, to the image processing section 31.

The image processing section 31 converts the image information, which is input from the image information input section 30, into the image information representing the grayscales of the respective pixels of the liquid crystal light valves 12R, 12G, and 12B, namely the image information for defining the drive voltages applied to the respective pixels. Further, the image processing section 31 performs, for example, an image quality adjustment process for adjusting the image quality such as the brightness, the contrast, the sharpness, and the color on the image information thus converted, and then outputs the image information thus processed to the OSD processing section 32 based on the instruction of the control section 20.

Based on an instruction of the control section 20, the OSD processing section 32 performs a process for displaying an on-screen display (OSD) image such as a menu image or a message image superimposed on the image (hereinafter also referred to as an "input image") based on the image information input therein. The OSD processing section 32 is provided with an OSD memory not shown, and stores the OSD image information representing figures, fonts, and so on for forming the OSD image. When the control section 20 instructs the superimposition of the OSD image, the OSD processing section 32 reads out the necessary OSD image information from the OSD memory, and then combines the OSD image information with the image information input from the image processing section 31 so that the OSD image is superimposed at a predetermined position on the input image. The image information combined with the OSD image information is then output to the liquid crystal drive section 14. It should be noted that in absence of the instruction from the control section 20 to superimpose the OSD image, the OSD processing section 32 outputs the image information input from the image processing section 31 directly to the liquid crystal drive section 14.

When the liquid crystal drive section 14 drives the liquid crystal light valves 12R, 12G, and 12B in accordance with the image information input from the OSD processing section 32, the image light corresponding to the image information is obtained by modulating the light emitted from the light source device 11 by the liquid crystal light valves 12R, 12G, and 12B, and the image light is projected through the projection lens 13.

In the present embodiment, the PC 200 is assumed to be a personal computer. The PC 200 has a password generation program 200a. When a lender of the rental company or the like inputs the serial number of the projector 100 to be lent and the information of the expiration date/time from the input section (not shown) such as a keyboard of the PC 200, the PC 200 performs a predetermined encoding process based on the serial number and the information of the expiration date/time to thereby generate the password PW, and then displays it on the display section (not shown) of the PC 200. The user using the projector 100 is informed of the password PW thus generated. By inputting the password PW to the operation accepting section 21 of the projector 100, the user can change the expiration date/time of the projector 100.

Here, the process of the PC 200 generating the password PW will be explained.

Figure 3:
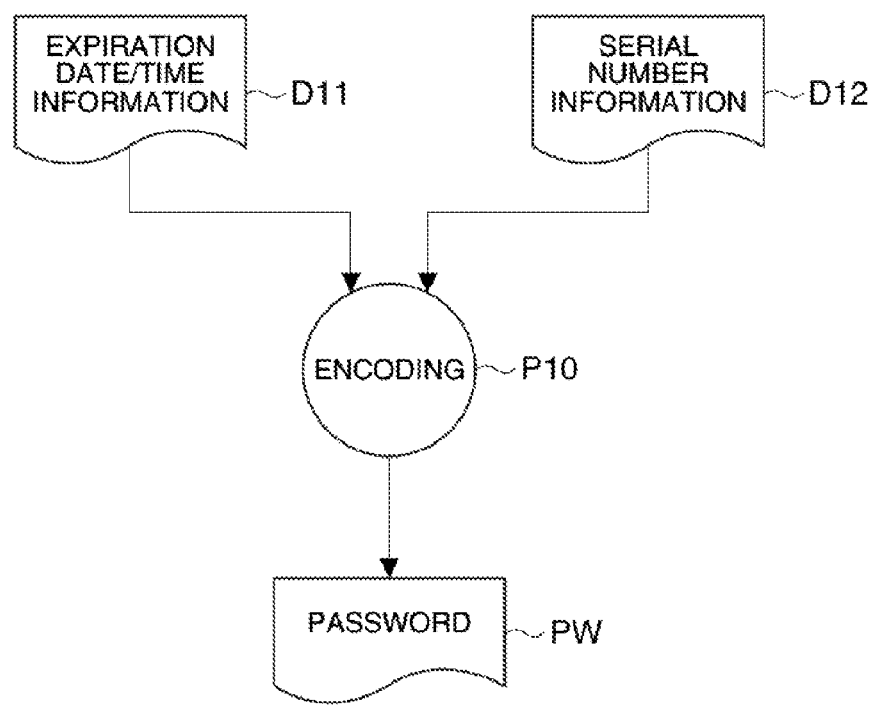
FIG. 3 is a data flow diagram when the PC generates a password.

FIG. 3 is a data flow diagram when the PC 200 according to the first embodiment generates the password PW.

As shown in FIG. 3, the PC 200 inputs expiration date/time information D11 and serial number information D12 of the projector 100, and then performs the encoding process (process P10). Then, the PC 200 outputs the password PW.

Then, a process performed when the projector 100 is started up will be explained.

Figure 4:
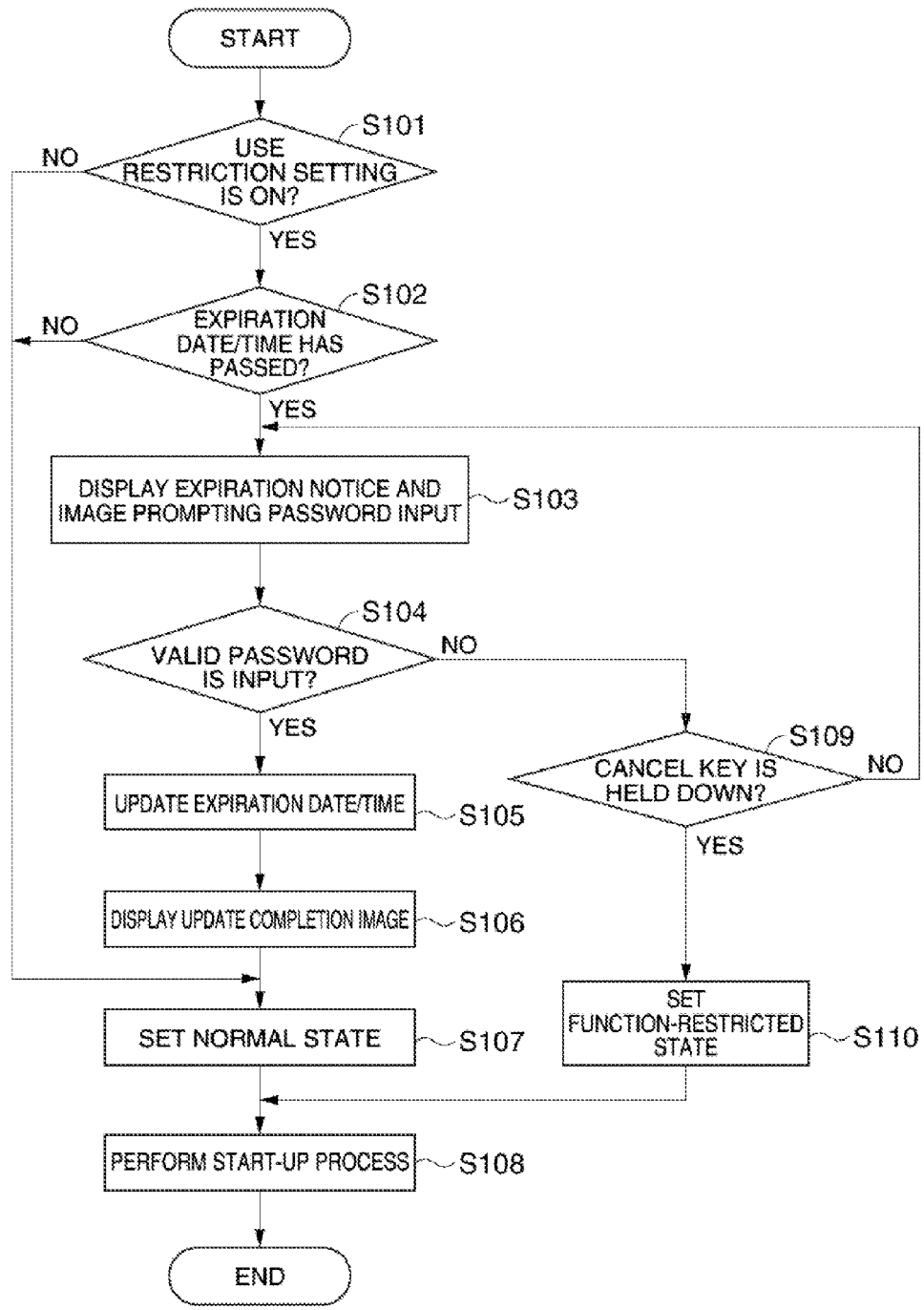
FIG. 4 is a flowchart of a process performed by the projector at start-up.

FIG. 4 is a flowchart of the process performed by the projector 100 according to the first embodiment at start-up.

When the power key provided to the operation accepting section 21 of the projector 100 is held down, the control section 20 reads out the information of the use restriction setting section 23, and then determines (step S101) whether or not the use restriction setting is in the ON state. If the use restriction setting is in the ON state (YES in the step S101), the control section 20 reads out the current date/time of the clock section 26, and then determines (step S102) whether or not the expiration date/time stored in the expiration date/time storage section 24 has passed.

If the expiration date/time has passed (YES in the step S102), the control section 20 issues an instruction to the OSD processing section 32 to display (step S103) an image for giving a notice of the expiration and prompting password input.

Here, the image for giving the notice of the expiration and prompting the password input will be explained.

Figure 5:
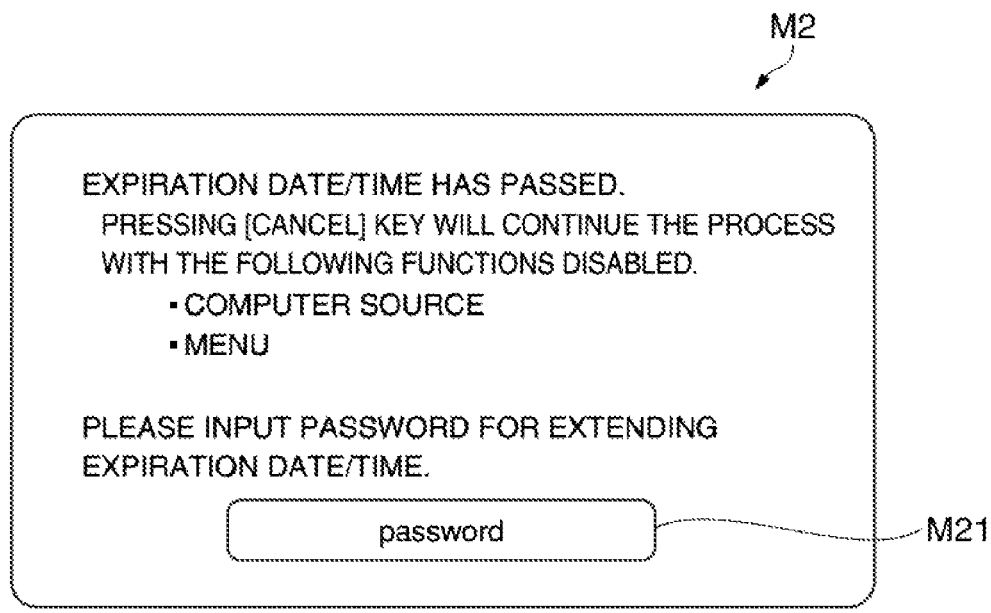
FIG. 5 is an explanatory diagram of an expiration notice image.

FIG. 5 is an explanatory diagram of the expiration notice image.

As shown in FIG. 5, in an expiration notice image M2, there is displayed "EXPIRATION DATE/TIME HAS PASSED. PRESSING [CANCEL] KEY WILL CONTINUE THE PROCESS WITH THE FOLLOWING FUNCTIONS DISABLED." Further, as the restricted functions to be disabled, the "COMPUTER SOURCE" and the "MENU" stored in the restricted function storage section 25 are displayed.

Further, "PLEASE INPUT PASSWORD FOR EXTENDING EXPIRATION DATE/TIME." is displayed below the expiration notice image M2, and a password input field M21 is displayed. Here, by inputting the password PW generated by the PC 200, the user can extend the expiration date/time.

Returning to FIG. 4, the control section 20 determines (step S104) whether or not the valid password has been input from the operation accepting section 21. Specifically, the control section 20 decodes the password thus input, and then determines whether or not the expiration date/time is a date/time on or later than the current date/time. On this occasion, the operation accepting section 21 corresponds to a password accepting section.

Here, the decode of the password and the comparison between the expiration date/time and the current date/time will be explained.

Figure 6:
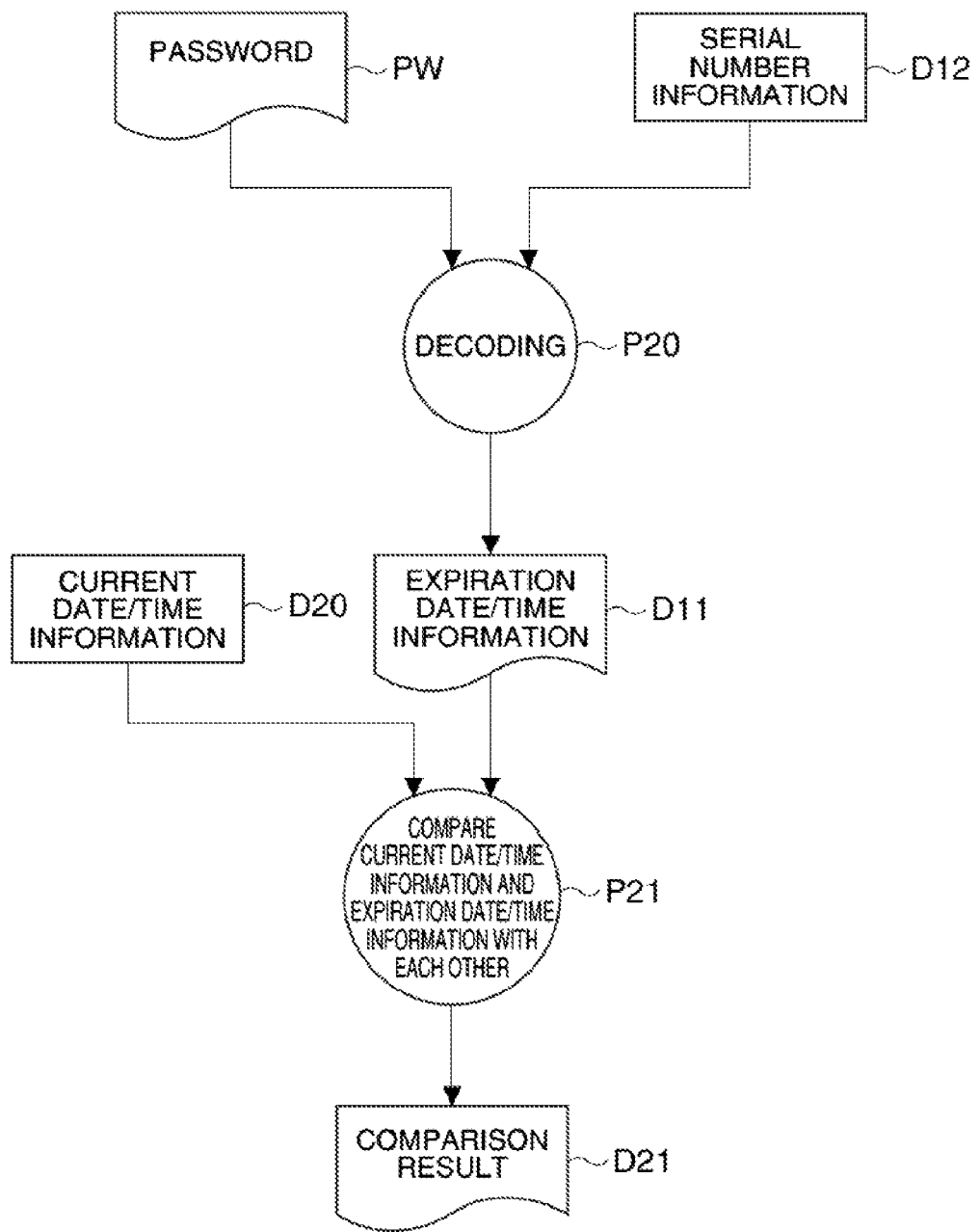
FIG. 6 is a data flow diagram regarding decode of the password.

FIG. 6 is a data flow diagram regarding the decode of the password.

As shown in FIG. 6, the control section 20 of the projector 100 inputs the password PW and the serial number information D12 stored in the serial number storage section 22, and then performs a decoding process (process P20). Then, the control section 20 outputs the expiration date/time information D11. On this occasion, the control section 20 corresponds to a decoding section.

The control section 20 inputs current date/time information D20 output by the clock section 26 and the expiration date/time information D11, and then compares the current date/time and the expiration date/time with each other (process P21). Then, the control section 20 outputs the comparison result. Specifically, if the expiration date/time is a date/time on or later than the current date/time, the comparison result D21 determining that the expiration date/time is valid is output. In other words, the control section 20 determines that the password PW is valid. If the expiration date/time is a date/time earlier than the current date/time, the comparison result D21 determining that the expiration date/time is invalid is output. It should be noted that if the control section 20 fails to correctly perform the decoding process, it is determined that the password PW input thereto is incorrect. On this occasion, the control section 20 corresponds to a comparison section.

Returning to FIG. 4, if the password is correct (YES in the step S104), the control section 20 changes (updates) (step S105) the information of the expiration date/time stored in the expiration date/time storage section 24 to the expiration date/time information D11 obtained by the decoding process. On this occasion, the control section 20 corresponds to an expiration date/time update section. Then, the control section 20 issues an instruction to the OSD processing section 32 to display (step S106) an update completion image.

Here, the update completion image will be explained.

Figure 7:
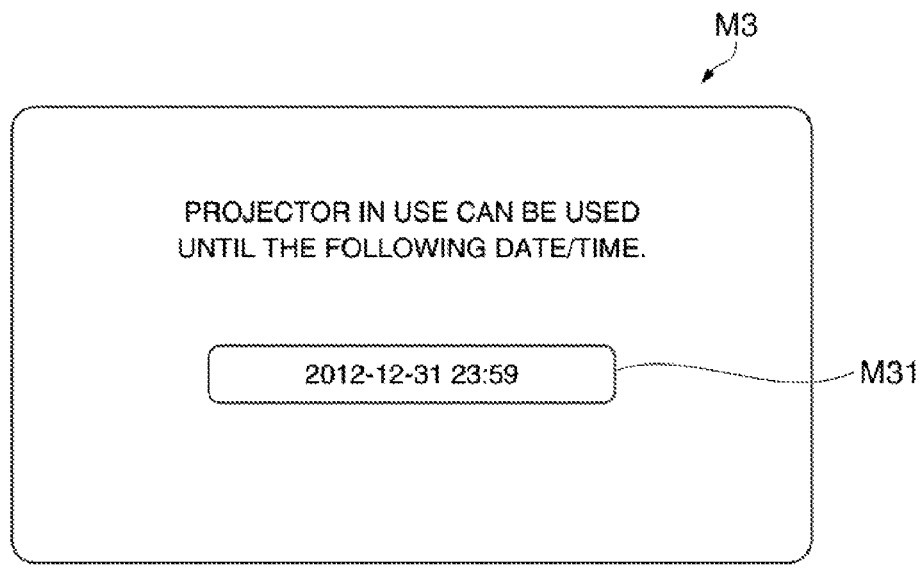
FIG. 7 is an explanatory diagram of an update completion image.

FIG. 7 is an explanatory diagram of the update completion image.

As shown in FIG. 7, "PROJECTOR IN USE CAN BE USED UNTIL THE FOLLOWING DATE/TIME." is displayed in the update completion image M3. Further, an expiration date/time display field M31 is displayed. In the expiration date/time display field M31, the expiration date/time stored in the expiration date/time storage section 24 is displayed. In other words, the expiration date/time thus updated is displayed.

Returning to FIG. 4, control section 20 sets the projector 100 to a normal state (step S107). In other words, the state with no functional restriction is set. Then, the control section 20 performs (step S108) the start-up process of the projector 100. Then, the process performed when the projector 100 is started up is terminated. The projector 100 thus started up in the normal state can be used with no restriction on the use of the functions.

If the valid password is not input (NO in the step S104), the control section 20 determines (step S109) whether or not a cancel key provided to the operation accepting section 21 has been held down. If the cancel key has been held down (YES in the step S109), the control section 20 sets the projector 100 to a function-restricted state (step S110). In other words, the state in which the restricted functions stored in the restricted function storage section 25 are unavailable is set. On this occasion, the control section 20 corresponds to a function restriction section. Then, the control section 20 performs (step S108) the start-up process of the projector 100. Then, the process performed when the projector 100 is started up is terminated. The projector 100 thus started up in the function-restricted state is set so that the restricted functions are unavailable, and some of the functions thereof cannot be used. Further, if all of the functions are restricted, the user is not allowed to perform any other operations than power-OFF.

If the cancel key has not been held down (NO in the step S109), the process proceeds to the step S103. If the expiration date/time has not passed (NO in the step S102), the process proceeds to the step S107, and the projector 100 is started up in the normal state. Further, if the use restriction setting is not in the ON state (NO in the step S101), the process proceeds to the step S107, and the projector 100 is started up in the normal state.

According to the first embodiment described above, the following advantages can be obtained.

1. The projector 100 accepts input of the password PW encoded based on the expiration date/time information D11 and the serial number information D12. The control section 20 decodes the expiration date/time information D11 based on the password PW thus input and the serial number information D12 stored in the serial number storage section 22. If the expiration date/time information D11 thus decoded corresponds to the date/time on or later than the current date/time information D20, the control section 20 stores the expiration date/time information D11 in the expiration date/time storage section 24. Thus, by the user inputting the password PW, the expiration date/time of the projector 100 can be changed (updated). In other words, the user can extend the expiration date/time, which is set to the projector 100 for the reason of the rental usage, by himself or herself. Therefore, it becomes easy to extend the expiration date/time. Further, since the expiration date/time information D11 is the information of a time (date/time) but not the information of a period of time, the "circulation control" by the rental company becomes easy.

2. Since the password PW, which is generated by the PC 200 and is then input to the projector 100, is encoded, it is unachievable for the user to recognize the expiration date/time from the password PW. Further, the user can be prevented from changing the expiration date/time without permission. Specifically, since the rental company generates the password PW using the PC 200 having the password generation program 200a, and then inform the user of the password PW, it can be avoided that the user generates or changes the password PW by himself or herself. Further, since the password PW is encoded based on the serial number information D12, it is possible to prevent the password PW from being diverted to another projector.

3. When powered ON, the projector 100 determines whether or not the current date/time information timed by the clock section 26 has exceeded the expiration date/time information stored in the expiration date/time storage section 24, and is then started up in the normal state if it has not exceeded. Further, if the current date/time information has exceeded the expiration date/time information, the projector 100 issues the expiration notice, and then accepts input of the password PW. Thus, at the start-up of the projector 100, the user can recognize the expiration (of the date/time until which the use is permitted) of the projector 100. Further, if the projector 100 has been expired, it is possible for the user to input the password PW to thereby conveniently update the expiration date/time information.

4. If the valid password PW is not input, and the cancel key is held down, the projector 100 restricts the use of the restricted functions stored in the restricted function storage section 25. Thus, it becomes unachievable to use some or all of the functions of the projector 100, and the user suffers inconvenience, and therefore, it results that the return of the projector to the rental company and the request of issuance of the password PW for extending the expiration date/time are prompted. Therefore, it becomes possible to usefully reduce the use of the projector 100 by the user beyond the expiration date/time without permission.

5. If the projector 100 is started up in the administrator-right mode, the projector 100 displays the expiration date/time setting menu image M1 to make the administrator (the rental company) select the restricted functions. Then the control section 20 stores the restricted function to the restricted function storage section 25. Thus, the rental company can usefully change the restricted function, the use of which is restricted in the projector 100 when the function-restricted state is set.

Second Embodiment

In the second embodiment, a projector 300 as an image display device, which updates the expiration date/time and the restricted function based on the password input thereto and a PC 400 for generating the password will be explained. It should be noted that the projector 300 and the PC 400 are also referred to collectively as an image display system. On this occasion, the PC 400 having a password generation program 400a corresponds to the password generation device.

The configurations of the projector 300 and the PC 400 according to the second embodiment are substantially the same as those of the projector 100 and the PC 200 according to the first embodiment (see FIG. 1). Therefore, the explanation therefor will be omitted. Here, the same constituents as those of the first embodiment will be denoted with the same reference numerals.

Firstly, the process of the PC 400 generating the password will be explained.

Figure 8:
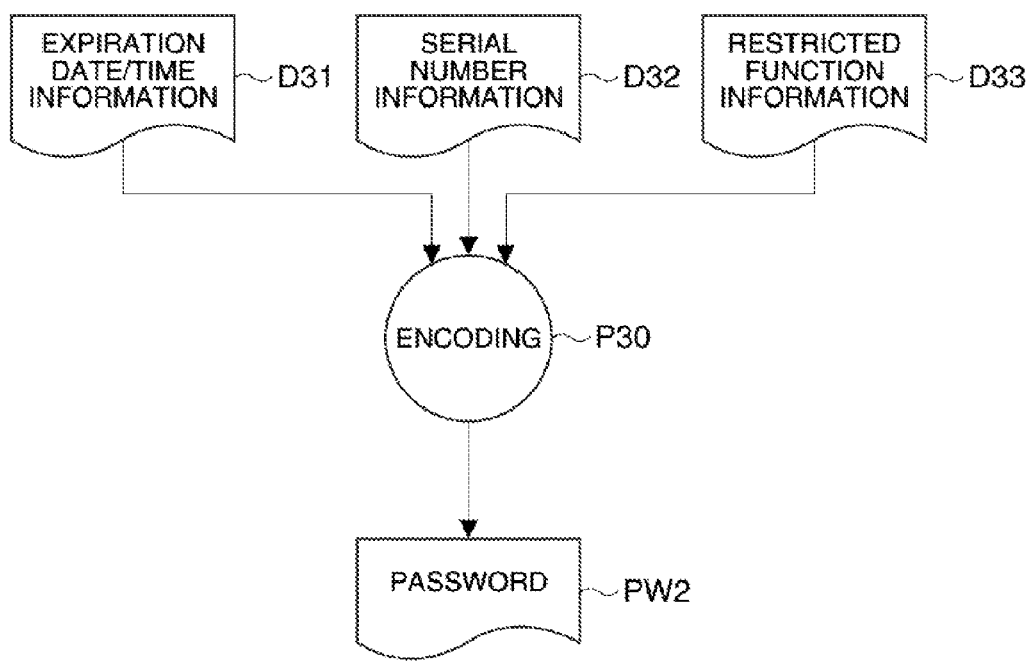
FIG. 8 is a data flow diagram when the PC according to a second embodiment of the invention generates a password.

FIG. 8 is a data flow diagram when the PC 400 according to the second embodiment generates the password PW2.

As shown in FIG. 8, the PC 400 inputs expiration date/time information D31, serial number information D32 of the projector 300, and restricted function information D33 of the function to be restricted in the function-restricted state, and then performs an encoding process (process P30). Then, the PC 400 outputs the password PW2.

Then, the process performed when the projector 300 is started up will be explained.

Figure 9:
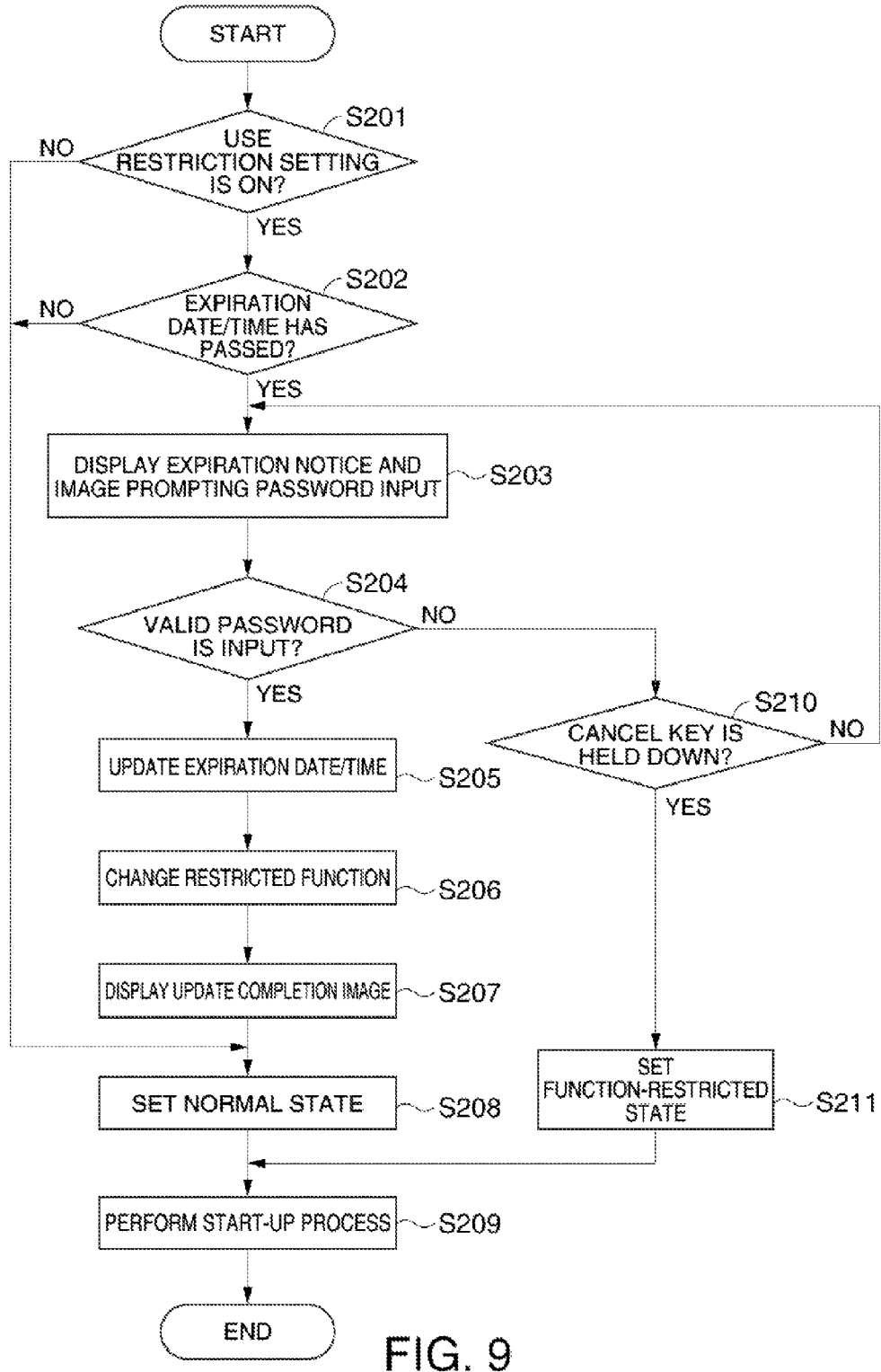
FIG. 9 is a flowchart of a process performed by the projector when starting up.

FIG. 9 is a flowchart of the process performed by the projector 300 according to the second embodiment at start-up.

The steps S201 through S203 are substantially the same as the steps S101 through S103 in the flowchart shown in FIG. 4 in the first embodiment.

Then, the control section 20 determines (step S204) whether or not the valid password has been input from the operation accepting section 21. Specifically, the control section 20 decodes the password thus input, and then determines whether or not the expiration date/time is a date/time on or later than the current date/time.

Here, the decode of the password and the comparison between the expiration date/time and the current date/time will be explained.

Figure 10:
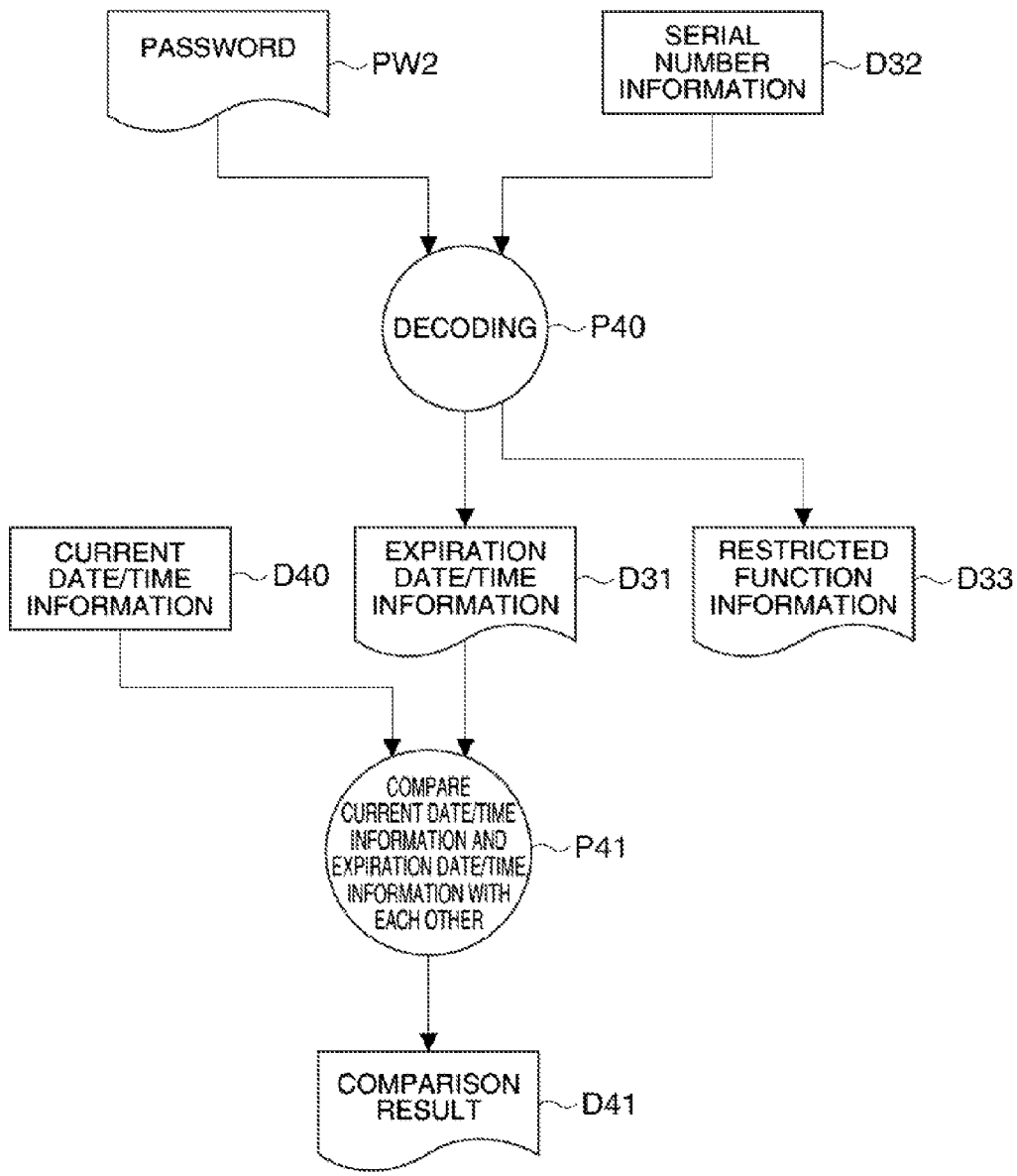
FIG. 10 is a data flow diagram regarding decode of the password.

FIG. 10 is a data flow diagram regarding the decode of the password according to the second embodiment.

As shown in FIG. 10, the control section 20 of the projector 300 inputs the password PW2 and the serial number information D32, and then performs the decoding process (process P40). Then, the control section 20 outputs the expiration date/time information D31 and the restricted function information D33.

The control section 20 inputs current date/time information D40 output by the clock section 26 and the expiration date/time information D31, and then compares the current date/time and the expiration date/time with each other (process P41). Then, the control section 20 outputs the comparison result. Specifically, if the expiration date/time is a date/time on or later than the current date/time, the comparison result D41 determining that the expiration date/time is valid is output. In other words, the control section 20 determines that the password PW2 is valid. If the expiration date/time is a date/time earlier than the current date/time, the comparison result D41 determining that the expiration date/time is invalid is output. It should be noted that if the control section 20 fails to correctly perform the decoding process, it is determined that the password PW2 input thereto is incorrect.

Returning to FIG. 9, if the password is correct (YES in the step S204), the control section 20 changes (updates) (step S205) the information of the expiration date/time stored in the expiration date/time storage section 24 to the expiration date/time information D31. Further, the control section 20 changes (step S206) the information of the restricted function stored in the restricted function storage section 25 to the restricted function information D33.

The process of the subsequent steps S207 through S209 is substantially the same as the process of the steps S106 through S108 in FIG. 4 in the first embodiment. Further, the process of the steps S210 through S211 is substantially the same as the process of the steps S109 through S110 in FIG. 4 in the first embodiment.

According to the second embodiment described above, the following advantage can be obtained.

The projector 300 accepts input of the password PW2 encoded based on the serial number information D32, the expiration date/time information D31, and restricted function information D33. The decoding section decodes the expiration date/time information D31 and the restricted function information D33. Then, the control section 20 stores the expiration date/time information D31 in the expiration date/time storage section 24, and the restricted function information D33 in the restricted function storage section 25. Thus, the expiration date/time and the restricted function, use of which is restricted when the projector 300 gets into the function-restricted state, can usefully be changed using the password PW2.

It should be noted that the invention is not limited to the embodiments described above, but can be put into practice with various modifications or improvements. Some modified examples will be described below.

First Modified Example

Although in the embodiments described above it is assumed that the unique number is the product serial number as the serial number of the projector 100, 300, the unique number is not limited to the product serial number, but can be a number unique to the projector 100, 300. It is also possible to assume that the unique number is the MAC address or the like.

Second Modified Example

Although in the embodiments described above, whether or not the expiration date/time has passed is determined and the password input is prompted at the start-up of the projector 100, 300, it is also possible to perform the determination on whether or not the expiration date/time has passed in the normal state after the start-up. Then, if the expiration date/time has passed, it is also possible to display the expiration notice image M2 to prompt input of the password.

Third Modified Example

Although in the embodiment described above the decoding process is performed using the password PW and the serial number information D12, and the expiration date/time information D11 is output, it is also possible to output the serial number information D12 and the expiration date/time information D11 based on the password PW. On this occasion, the projector compares the serial number information D12 thus decoded with the serial number information stored in the serial number storage section 22. If they match each other, the projector compares the current date/time and the expiration date/time with each other, and then outputs the comparison result D21.

Fourth Modified Example

Although in the embodiments described above it is assumed that the PC 200, 400 is a personal computer, the PC 200, 400 is not limited to the personal computer.

Fifth Modified Example

Although in the embodiments described above, the explanation is presented citing the projector 100, 300 as an example of the image display device, the image display device is not limited to the projector. It is also possible to apply the invention to, for example, a rear projector integrally provided with a transmissive screen, a liquid crystal display, a plasma display, an organic electroluminescence (EL) display, and a television receiver.

Sixth Modified Example

Although in the embodiments described above, the light source device 11 is configured including the discharge light source lamp 11a, a sold-state light source such as a light emitting diode (LED) light source or a laser, or other light sources can also be used therefor.

Seventh Modified Example

Although in the embodiments described above the projector 100, 300 uses the transmissive liquid crystal light valves 12R, 12G, and 12B as the light modulation devices, it is also possible to use reflective light modulation devices such as reflective liquid crystal light valves. Further, it is also possible to use a micromirror array device for modulating the light emitted from the light source by controlling the emission direction of the incident light for every micromirror as a pixel.

What is claimed is:

1. An image display device adapted to display an image, comprising:
    a clock section adapted to time current date/time information including a date and a time;
    an expiration date/time storage section adapted to store expiration date/time information as information of a date/time until which use of the image display device is allowed;
    a password accepting section adapted to accept input of a password encoded based on predetermined expiration date/time information;
    a decoding section adapted to decode the predetermined expiration date/time information from information of the password accepted by the password accepting section;
    a comparison section adapted to compare the predetermined expiration date/time information decoded by the decoding section and the current date/time information timed by the clock section with each other; and
    an expiration date/time update section adapted to store the predetermined expiration date/time information in the expiration date/time storage section if the predetermined expiration date/time information decoded is a date/time one of on and later than the current date/time information.

2. The image display device according to claim 1, further comprising:
    a unique number storage section adapted to store a unique number of the image display device,
    wherein the password is encoded based on information of the unique number of the image display device and the predetermined expiration date/time information, and
    the decoding section decodes the predetermined expiration date/time information based on the information of the password accepted by the password accepting section and the information of the unique number stored in the unique number storage section.

3. The image display device according to claim 1, further comprising:
    a unique number storage section adapted to store a unique number of the image display device,
    wherein the password is encoded based on information of the unique number of the image display device and the predetermined expiration date/time information,
    the decoding section decodes the predetermined expiration date/time information and the information of the unique number based on the information of the password accepted by the password accepting section, and
    the comparison section compares the predetermined expiration date/time information decoded by the decoding section and the current date/time information timed by the clock section with each other if the unique number decoded and the unique number stored in the unique number storage section match each other.

4. The image display device according to claim 1, wherein the password accepting section accepts input of the password if a date/time represented by the current date/time information exceeds a date/time represented by the expiration date/time information stored in the expiration date/time storage section when the image display device is powered on.

5. The image display device according to claim 1, further comprising:
    a function restriction section adapted to restrict use of a predetermined function of the image display device if the password accepting section fails to accept the valid password.

6. The image display device according to claim 5, further comprising:
    a restricted function storage section adapted to store a restricted function, use of which is restricted by the function restriction section;
    a mode control section adapted to make a transition to an administrator-right mode if a predetermined operation is performed on the image display device;
    a restricted function selection section adapted to make the restricted function use of which is restricted by the function restriction section be selected in the administrator-right mode; and
    a control section adapted to store the restricted function selected by the restricted function selection section in the restricted function storage section.

7. The image display device according to claim 6, wherein the password accepting section receives the password encoded based on information of the predetermined restricted function use of which is restricted by the function restriction section in addition to the information of the unique number of the image display device and the predetermined expiration date/time information,
    the decoding section decodes the predetermined expiration date/time information and the information of the predetermined restricted function, and
    the control section stores the predetermined restricted function in the restricted function storage section.

8. An image display system comprising:
    the image display device according to claim 1; and
    a password generation device adapted to perform encoding based on the information of the unique number of the image display device and the predetermined expiration date/time information to generate the password.

9. An image display system comprising:
    the image display device according to claim 2; and
    a password generation device adapted to perform encoding based on the information of the unique number of the image display device and the predetermined expiration date/time information to generate the password.

10. An image display system comprising:
    image display device according to claim 3; and a password generation device adapted to perform encoding based on the information of the unique number of the image display device and the predetermined expiration date/time information to generate the password.

11. An image display system comprising:
image display device according to claim 4; and
a password generation device adapted to perform encoding based on the information of the unique number of the image display device and the predetermined expiration date/time information to generate the password.

12. An image display system comprising:
image display device according to claim 5; and
a password generation device adapted to perform encoding based on the information of the unique number of the image display device and the predetermined expiration date/time information to generate the password.

13. An image display system comprising:
the image display device according to claim 6; and
a password generation device adapted to perform encoding based on the information of the unique number of the image display device and the predetermined expiration date/time information to generate the password.

14. An image display system comprising:
the image display device according to claim 7; and
a password generation device adapted to perform encoding based on the information of the unique number of the image display device, the predetermined expiration date/time information, and the information of the predetermined restricted function use of which is restricted by the function restriction section to generate the password.

15. A method of controlling an image display device, the method comprising:
providing the image display device having
a clock section adapted to time current date/time information including a date and a time,
an expiration date/time storage section adapted to store expiration date/time information as information of a date/time until which use of the image display device is allowed, and
a unique number storage section adapted to store a unique number of the image display device, and
adapted to display an image;
accepting input of a password encoded based on the information of the unique number of the image display device and the predetermined expiration date/time information;
decoding the predetermined expiration date/time information from information of the password accepted in the accepting;
comparing the predetermined expiration date/time information decoded in the decoding and the current date/time information timed by the clock section with each other; and
storing the predetermined expiration date/time information in the expiration date/time storage section if the predetermined expiration date/time information decoded is a date/time one of on and later than the current date/time information.

\* \* \* \* \*